Figure 1:
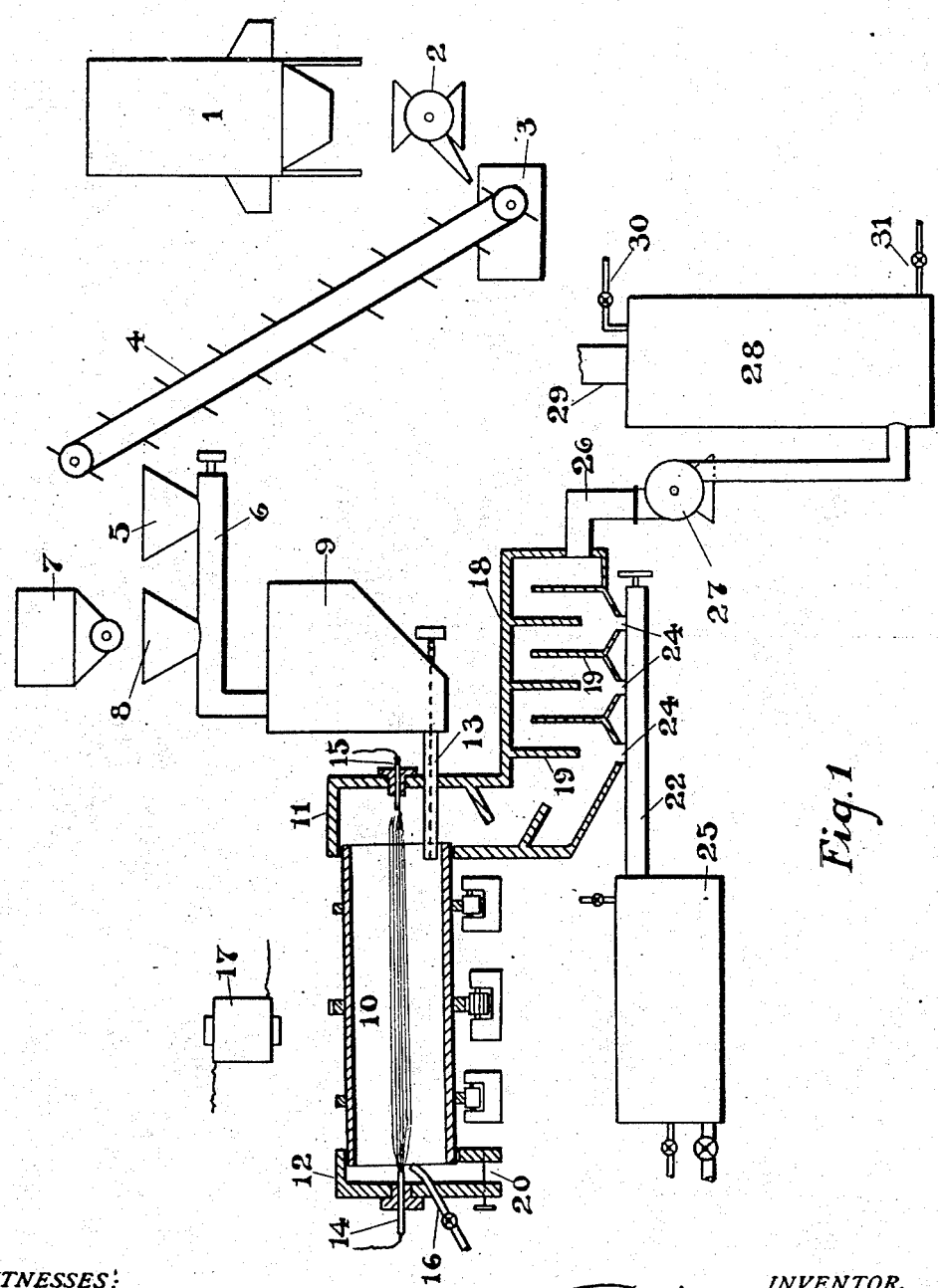

C. ELLIS.
PROCESS OF TREATING EARTHY MATERIALS.
APPLICATION FILED FEB. 25, 1911.

999,494.

Patented Aug. 1, 1911.

3 SHEETS—SHEET 2.

WITNESSES:

INVENTOR.

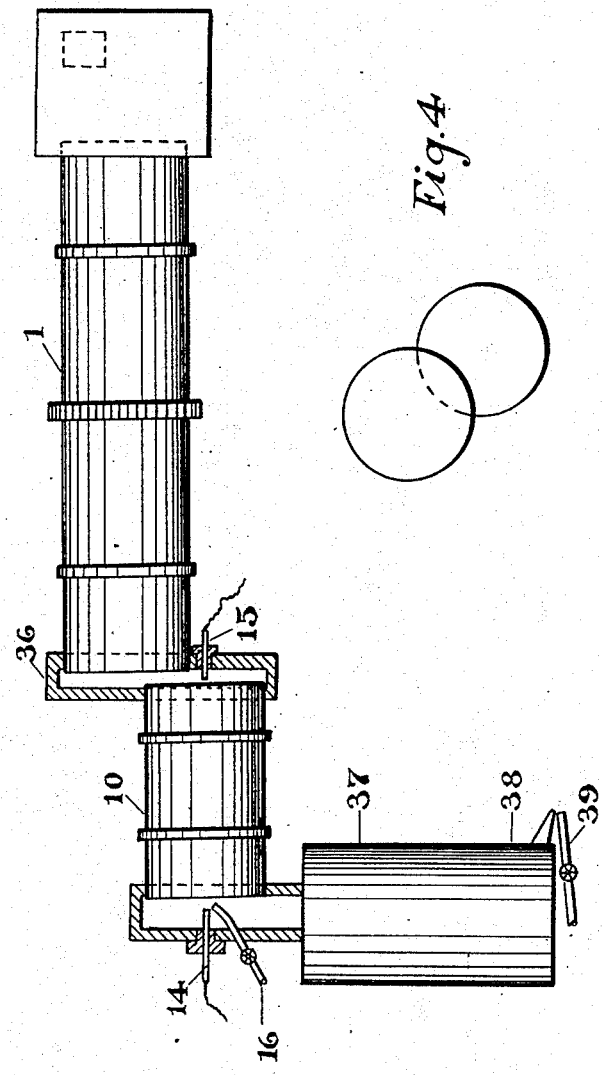

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF TREATING EARTHY MATERIALS.

999,494.  Specification of Letters Patent.  Patented Aug. 1, 1911.

Application filed February 25, 1911. Serial No. 610,705.

*To all whom it may concern:*

Be it known that I, CARLETON ELLIS, a citizen of the United States, and a resident of Montclair, in the county of Essex and State of New Jersey, have invented certain new and useful Improvements in Processes of Treating Earthy Materials, &c., of which the following is a specification.

The invention relates to a process of heating or igniting earthy materials, and in particular hydraulic cement materials and other products, by means of electrically generated heat.

Methods have been proposed for burning cement, for example, by direct electric heat, such as that for instance involving the formation of the ordinary short arc between two electrodes and the projection of the raw cement material into contact with such an arc. For practical reasons however, the burning of Portland cement in this manner is attended with difficulty. Moreover the handling of materials in such large quantities as is necessarily involved in the manufacturing of a bulky commodity like Portland cement, makes this method extremely difficult, if not impractical to carry out.

The present invention involves the production of a long heating or radiating arc, which may be projected, for example into an ordinary rotary kiln for a very considerable distance, or even throughout the entire length of a short rotary kiln, and which, owing to its enormous temperature serves to rapidly convert the raw cement materials into Portland cement clinker, or to ignite other earthy materials, such for example as pulverized phosphate rock. At the same time, by contact of air with the flaming arc, oxidation of the nitrogen of the air occurs to a considerable degree, resulting in the formation of oxids of nitrogen which may be converted into useful fertilizing materials, and this oxidation is further enhanced in the present instance by suitably contacting the air currents while highly heated by the electric arc with the cement material or other earthy materials, so as to produce a catalytic effect.

Ordinarily the arc produced by the alternating current, especially if the arc is of considerable length, is extremely unsteady and is rather easily "blown out" by extraneous currents of air, or even by a fairly well regulated air current, traveling longitudinally of the arc. If however, air is projected around the arc tangentially, or so as to form a spiral current encircling the arc, the said arc may be rendered steady and may be extended to a great length without loss of stability.

In the present practice of burning Portland cement, a rotary kiln is employed and usually powdered coal is used as a fuel, forming a flame which travels along the axis of the kiln according to usual practice, and which serves to both calcine and clinker the cement material. Clinkering requires a very high temperature while calcining requires no great amount of heat. Clinkering requires no great amount of air, so far as the action of the latter on the material is concerned, while calcining calls for a considerable amount of air, in order to carry away the carbon dioxid evolved from the material. It is not necessary in the present invention to conduct calcination and clinkering in the same kiln or section, as the operation may often be more conveniently conducted in two stages. Calcination for example, may be conducted in an ordinary shaft kiln, fired with coal, or in a rotary kiln fired by producer gas or powdered coal. Under such circumstances clinkering of the calcines may be carried on by electrical heat, preferably applying this efficient heating agent to the hot calcines. Or the hot gases from the clinkering apparatus may be used for partial calcination. It is, on the whole, rather desirable to carry on the two operations separately, as the character of the reaction in the two cases is different. Calcination as stated, preferably calls for prolonged heat treatment, with what is known as a soaking heat, owing to the gradual elimination of the carbon dioxid, which is a reaction of an endothermic character by nature. Clinkering is probably exothermic by nature and simply requires momentarily, as it were, a very intense heat to bring the materials up to the critical or clinkering temperature.

In carrying out my process, raw materials containing potash may be used, so that in the very high temperature zone of electrical heat the operation of clinkering this potash may be more or less expelled from the material and recovered as a valuable manurial material. A great many silicious materials employed in the manufacture of Portland cement contain small percentages of potash and soda. Ordinarily these remain in the clinker and are considered rather detrimental than otherwise from the standpoint of manufacturing sound Portland cement. The removal of these alkalis would therefore be advantageous from a point of view of improving the quality of the Portland cement. Although the alkalis occur in relatively small amounts in ordinary cement rock, owing to the very large quantities of cement raw materials, which are manufactured into Portland cement, the quantity of potash that could be recovered is large in amount. The use of silicious materials carrying large proportions of potash also is possible, as for example feldspar, glauconite, potash mica and the like.

As previously stated, the passage of air through the electrically heated clinkering zone in more or less contact with the incandescent clinker, permits of such catalytic action that the oxidation of the nitrogen of the air is rendered rapid and effective and the oxids of nitrogen which are formed may be recovered by treatment with an absorbing agent, such as milk of lime and the like, to form nitrates, or nitrites suitable for fertilizing purposes.

Figure 2:
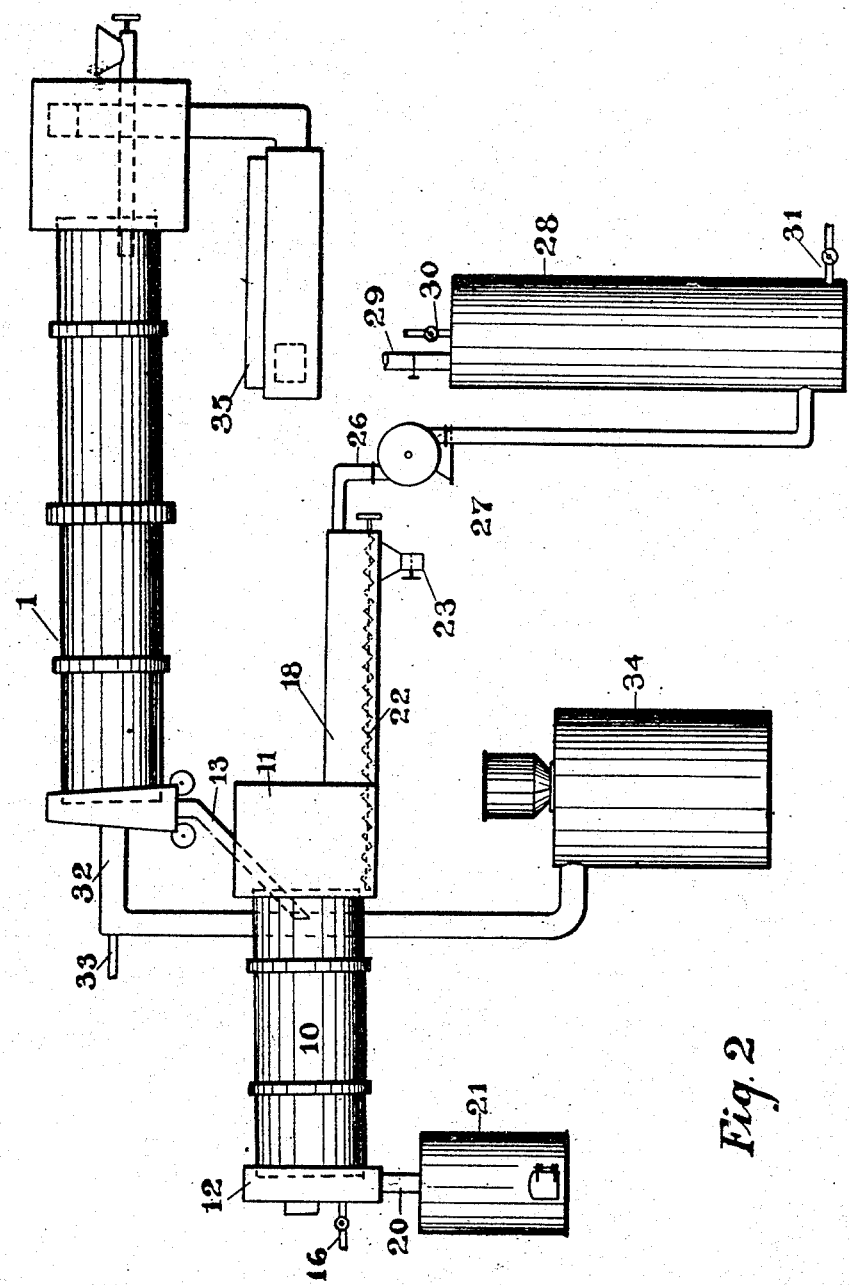

In the accompanying drawings, which are of a diagrammatic character, Figure 1 shows partly in elevation and partly in section, apparatus for calcining the cement raw material, and electrical means for clinkering it. Fig. 2 shows in elevation the arrangement of apparatus adopted for the same purpose, involving rotary kilns for both calcination and clinkering. Fig. 3 shows an elevation of the calcining and clinkering kiln wherein the electrically generated heat in the clinkering section is used for calcination. Fig. 4 shows the location of the two kilns of Fig. 3 with respect to each other.

In the several characters, like characters denote like parts.

In the drawings, 1 is a shaft kiln in which lime stone or cement rock may be calcined to remove carbon dioxid moisture and the like.

2 is a grinder discharging into the well, 3. An elevator, 4, conveys to the hopper 5, from which a conveyer, 6, leads to the storage bin, 9. A bin, 7, containing clay or other materials which may be added to the calcined material, is arranged to deliver to the hopper 8, which communicates to the conveyer, 6.

10 is a clinkering section, and in the present instance, is a rotary inclined kiln, having the housing, 11, at the upper end, and the hood, 12, at the lower end. The conveyer, 13, serves to deliver the material from the bin 9, to the rotary section 10. An electrode 14, is placed in the hood 12, and a second terminal 15, is located in the housing 11. A pipe, 16, serves to introduce air into the section 10, and this is preferably arranged so as to deliver the air spirally about the arc formed between the electrodes 14 and 15. While only one jet is here shown, for the sake of simplicity, it is to be understood that a plurality of such jets may be used. Adjacent to the kiln, is a magnet, 17, which may be used to deflect the arc formed between electrodes 14 and 15, to such an extent as may be desired. An extension of the housing 11, forms a dust chamber, 18, equipped with baffles, 19, serving to collect the dust, or sublimate of potash or other alkalis. Outlets, 24, into the conveyer, 22, serve to carry these potash concentrates to the leaching chamber 25, where water may be used for the extraction of the potash or it may be treated in other ways according to circumstances. Outlet pipe, 26, equipped with a pump, or blower, 27, connects the dust chamber 18, with the absorption tower, 28. The latter has an outlet, 9, for the escape of the washed gases, and the inlet, 30, and outlet, 31, for the absorbing liquor.

The operation of the process is as follows:—Limestone or cement rock is calcined in the kiln 1, ground in the grinder 2, conveyed to the hopper 5, mixed with clay from hopper 7, and entered into bin 9. An arc is produced between the electrodes 14 and 15 and air is introduced in the spiral manner indicated. An alternating current of from 4,000 to 6,000 volts for generating the aforesaid arc preferably should be used, and this for commercial reasons ordinarily may be a three phase system. Three or more arcs may be arranged to work on the three phases of such a system, with the kiln connecting with a neutral junction. With a kiln about twenty feet long and about twenty inches in diameter a current of from 200 to 300 amperes at 4,000 to 6,000 volts may be used. With kilns of larger cross section, correspondingly greater currents and potentials may be used. The length of the kiln largely determines the voltage necessary to strike the requisite arc, while amperage is adjusted in accordance with the heating effect required. With a small body of material in the rotary kiln the amperage should be considerably less than when treating a heavy charge of material. The calcined material, mixed with sufficient silicious material to make the proper raw composition for Portland cement is entered into the clinkering section 10 and subjected to the enormous heat of the electric arc. In order to protect the lining of the kiln as much as possible, the section may be rotated at high speed so as to carry the material high up on the side of the kiln which is ascending and by the application of the electrode magnet the arc may be deflected at one or more points into more or less contact with the clinkering material and away from the exposed lining on the opposite side. The clinkered product is removed at the outlet 20 and the dust and potash sublimate from the operation collected in the chamber 18, is carried to the leaching or concentrating apparatus 25. The gases coming from the clinkering section are conveyed through the pipe 26, by the pump 27, to the absorption tower 28, where they meet with a current of milk of lime or other absorbing agent descending the absorbing tower. The waste gases leave at the outlet 29. If desired the alkaline concentrates from the chamber 25 may be conveyed to the absorption tower 28, so as to form a nitrate or nitrite of potash which is excellent fertilizing material.

In Fig. 2, 1 is a rotary calcining section, having the producer gas inlet 32, and the air inlet 33. 34 is a gas producer supplying the section 1, and the waste gases from this section are taken to an evaporating point 35, which is used to evaporate the nitrogenous or potassic liquors. The clinkering section is electrically heated, the terminals not being shown in this case. Section 10 has a housing 11, at its upper end and a hood 12, at the lower end. A chute 13, conveys the calcines from section 1, to section 10. 16 is an air inlet into section 10. 20 is a chute permitting the discharge of clinker into the clinker receptacle or cooler, 21. A dust chamber is shown at 18, having the conveyer 22, an outlet for the dust or potash concentrations, 23. A pipe, 26, and blower, 27, convey the gases from the clinkering section, to the absorption tower 28, as indicated in Fig. 1. In the operation of this apparatus the raw material is calcined in section 1, using producer gas derived from the producer 34. The material is electrically clinkered in section 10 and the other operations are carried out as indicated in Fig. 1.

In Fig. 3, the electric arc generated between the terminals 14 and 15, serve to clinker the calcines, which are produced in section 1, by the waste heat from the arc in section 10. The waste gases may be withdrawn and the nitrates and nitrites removed and if desired, the carbon dioxids from the calcines may be separately recovered; the stages of the operation not being depicted here, but being substantially similar to the operations as described in Figs. 1 and 2. In Fig. 3, the receptacle 27 may be used either to hold clinkers in a granular condition in which they may be cooled and the air used for cooling, may if desired, be introduced by the pipe 16, so that preheated air is supplied to the arc between terminals 14 and 15. The connections necessary for carrying this detail of the operation out are not shown here but are obvious from the foregoing description. The receptacle 37 may serve another purpose in that the operation of the kiln may be so conducted that the clinker is delivered into the receptacle 37 in a molten condition, from which it may be discharged by spout 38 and meet with a current of air, steam or inert gases, issuing from jet 39, whereby the clinker becomes finely divided and reduced to such a condition that the final grinding of the product is very simply and cheaply done.

In the operation of the clinkering section, it is usually necessary to admit only sufficient air to give stability to the arc and produce the maximum of oxid of nitrogen. Owing to the very high temperature which may be secured in the clinkering kiln a fairly heavy charge of the cement material should be introduced, and, as stated, the kiln should be rather rapidly rotated, preferably in the direction of the spiral current of air produced by the stabilizing currents of air. If desired, the kiln may be lined with graphitized fire brick, so as to furnish a conducting medium in order that the arc may either be started more easily, or if desired, may be caused to terminate not in the hood of the kiln but at some point along the shaft of the kiln, thereby producing sort of an impinging arc. The fact that the amount of air employed may be restricted to simply that required for stabilizing the arc and produce the maximum amount of oxid of nitrogen, brings about conditions which ordinarily do not obtain in the ordinary coal fired kiln, where an enormous amount of air is used for combustion and this gives rise to a tremendous loss of heat through the sensible heat carried away in the escaping gases.

Instead of manufacturing Portland cement in this apparatus, other materials may be ignited or heat treated, such for example as calcium phosphate, ordinary phosphate of lime which in its natural state, is not readily available for fertilizing, and requires treatment with sulfuric acid, and the like. By heating such phosphate rock to the very high temperature of the electric arc, the phosphorus is rendered more available, especially if produced in a fused condition, by the addition of a flux, such as feldspar, with subsequent atomization of the fused phosphate. Or the phosphate rock may be ignited with sulfate of magnesia, calcium chlorid, quick lime, or other agents, which serve to disintegrate it, using if necessary, a flux such as feldspar or glauconite, thereby making possible the simultaneous production of nitrogen, potash and phosphorus in a form available for fertilizing purposes, the waste heat of the apparatus serving conveniently to dry out the extracts containing soluble potash, nitrates and the like.

Having described my invention, to the details of which I do not wish to be limited, what I claim is:—

1. The process of treating earthy material which consists in heating it to a high temperature in the heating zone of an electric arc in the presence of air, in withdrawing said earthy material and air and removing from the latter its oxid of nitrogen.

2. Process of treating earthy material which consists of heating said material to a high temperature in the heating zone of an electric arc in the presence of air and allowing said air to contact with said earthy material, whereby catalytic action resulting in the acceleration of the oxidation of the nitrogen of said air is brought about, in withdrawing said earthy material and air and removing from the latter its oxids of nitrogen.

3. The process of treating earthy material containing potash which consists in heating the material to a high temperature in the heating zone of a flaming electric arc in the presence of air, in withdrawing said earthy material and air and in removing from the latter its oxids of nitrogen.

4. The process of treating cement-forming material which consists in heating the material to a high temperature in the heating zone of an electric arc in the presence of air, in withdrawing the cement material in a clinkered condition, in removing air and dust and in separating oxid of nitrogen from said air.

5. The process of treating previously-calcined cement material, which consists of heating it to a high temperature in the heating zone of an elongated electric arc in the presence of air, in withdrawing the cement material when clinkered, in removing the dust and air and in separately absorbing the oxid of nitrogen contained in said air.

6. The process of treating cement material which consists in calcining the material, in heating it to a high temperature in the heating zone of an electric arc in the presence of air, in withdrawing the cement material when clinkered, near one extremity of the electric arc and in removing the air and dust from a point near the opposite extremity of the arc, in freeing the dust from potash and the air from its oxids of nitrogen.

7. The process of treating Portland cement material containing potash which consists in heating it to a high temperature while traveling in a stream in the heating zone of an elongated electric arc, in introducing air spirally around said arc, whereby the latter is stabilized, in withdrawing the cement material when clinkered, in collecting the dust and air, in removing the potash from the dust and oxid of nitrogen from the air.

8. The process of treating earthy material, which consists in passing it through the heat zone of an elongated electric arc, in passing air spirally about said arc whereby the latter is stabilized, in causing the air currents to contact with the earthy material in an incandescent condition whereby nitrogen is oxidized by catalytic action, in removing the earthy material at a point near one extremity of the arc and removing air and dust from a point near the opposite extremity of the arc and in recovering oxid of nitrogen from the air.

9. The process of treating earthy material containing potash, which consists in passing it through a heated zone of an elongated electric arc, in passing air spirally about said arc whereby the latter is stabilized, in causing an air current to contact with the earthy material in an incandescent condition whereby nitrogen is oxidized by catalytic action, in removing the earthy materials at a point near one extremity of the arc, in removing the air and dust from a point near the opposite extremity of the arc, in recovering the oxid of nitrogen from the air and potash from the dust.

10. In the process of treating earthy materials, the subprocess which consists in subjecting a gaseous mixture, comprising essentially oxygen and nitrogen, to an electric arc, in the presence of a difficultly-fusible mineral catalyzer having a highly roughened surface; and in maintaining said gaseous mixture within the high-temperature zone of said arc and in frequent contact with said catalyzer, all for a sensible period; whereby a portion of the said oxygen and nitrogen enter into combination.

11. In the process of treating earthy materials, the subprocess which consists in subjecting a gaseous mixture, comprising essentially oxygen and nitrogen, to an electric arc in the presence of a difficultly-fusible mineral catalyzer, having a highly roughened surface, in maintaining said catalyzer in constant agitation; and in impelling said gaseous mixture through the high-temperature zone of said arc, and in frequent contact with said catalyzer, all for a sensible period; whereby a portion of the said oxygen and nitrogen enters into combination.

Signed at Montclair, in the county of Essex and State of New Jersey this 14th day of February A. D. 1911.

CARLETON ELLIS.

Witnesses:
S. M. SPEDON,
B. M. ELLIS.